United States Patent [19]
Fox et al.

[11] Patent Number: 5,157,393
[45] Date of Patent: Oct. 20, 1992

[54] COMMUNICATION SYSTEM FOR TRANSMITTING DATA BETWEEN A TRANSMITTING ANTENNA UTILIZING LEAKY COAXIAL CABLE AND A RECEIVE ANTENNA IN RELATIVE MOVEMENT TO ONE ANOTHER

[75] Inventors: Timothy R. Fox, Chicago; Jerry C. Posluszny, Stickney, both of Ill.

[73] Assignee: Kabushiki Kaisha Toshiba, Kanagawa, Japan

[21] Appl. No.: 815,831

[22] Filed: Dec. 24, 1991

Related U.S. Application Data

[63] Continuation of Ser. No. 316,991, Feb. 28, 1989, abandoned.

[51] Int. Cl.⁵ ............................................. G08C 19/00
[52] U.S. Cl. .............................. 340/870.3; 333/237; 393/763; 378/4; 378/15
[58] Field of Search ............. 340/870.3, 552; 333/237, 256, 261; 343/763; 378/4, 15

[56] References Cited

U.S. PATENT DOCUMENTS

| | | | |
|---|---|---|---|
| 3,781,687 | 12/1973 | Nakahara et al. | 333/237 |
| 4,135,185 | 1/1979 | Rothan et al. | 340/552 |
| 4,224,607 | 12/1980 | Poirier et al. | 333/237 |
| 4,259,584 | 3/1981 | Krumme | 378/19 |
| 4,538,125 | 8/1985 | Beckmann et al. | 378/15 |
| 4,612,536 | 9/1986 | Harman | 340/552 |
| 4,796,183 | 1/1989 | Ermert et al. | 364/413.15 |

OTHER PUBLICATIONS

R. E. Ziemer & R. L. Peterson, Digital Communication and Spread Spectrum Systems 177 (1985).

*Primary Examiner*—Donald J. Yusko
*Assistant Examiner*—Michael Horabik
*Attorney, Agent, or Firm*—Finnegan, Henderson, Farabow, Garrett and Dunner

[57] ABSTRACT

A communication system for transmitting data between a transmitting platform and a receiving platform, having two equal lengths of leaky coaxial cable forming the transmitting antenna which is located on the transmitting platform and the receive antenna is located on the receiving platform. The two equal lengths of leaky coaxial cable form a circle wherein one end of each of the equal lengths is a feedpoint for inputting data and the other end of each of the two equal lengths is terminated with a resistor to ground. The receive antenna is maintained a predetermined distance from the plane of the transmitting antenna.

16 Claims, 5 Drawing Sheets

COMMUNICATION SYSTEM FOR TRANSMITTING DATA BETWEEN A TRANSMITTING ANTENNA UTILIZING LEAKY COAXIAL CABLE AND A RECEIVE ANTENNA IN RELATIVE MOVEMENT TO ONE ANOTHER

This application is a continuation of application Ser. No. 07/316,991, filed Feb. 28, 1989 now abandoned.

BACKGROUND OF THE INVENTION

The present invention relates to a communication system and, more particularly, to a system for transmitting data between a transmitting platform and a receiving platform using leaky coaxial cable as the transmitting antenna located on the tramsmitting platform.

For cross reference purposes, the existence of a concurrently filed application, Ser. No. 07/317,026, is noted. This application, entitled "Communication System For Transmitting Data Between a Transmitting Antenna Utilizing Strip-line Transmission Line And a Receive Antenna in Relative Movement to One Another" by Timothy R. Fox, is commonly owned by the same assignee.

The primary use of such systems employing leaky coaxial cables is for communication in tunnels or in large buildings where portable receivers are used to receive data from a transmitter. A difference between this elementary version of the system and a system for transmitting data between a rotating platform and a stationary platform is that, in the elementary system, the receive antenna is in a far field region and thus picks up the radiated electromagnetic wave from the entire transmitting antenna. In the rotating platform and stationary platform arrangement, the receive antenna is in very close proximity to the transmitting antenna and the receive antenna senses the electromagnetic field from the voltage on the transmission line near the receive point.

A communication system for transmitting data between a rotating platform and a stationary platform finds particular utility in CT scanners. The data come from a transmitter source and are applied to a suitable modulator that modulates a sinusoidal radio-frequency carrier signal. The modulated carrier signal is applied to the feedpoint of the transmitting antenna. The transmitter carrier source, the suitable modulator and the transmitting antenna are mounted on the transmitting platform, and the transmitting platform is rotating.

The transmission often is achieved using brushes sliding against slip rings to make a set of electrical connections beween the rotating and stationary platforms. This mechanical contact causes a number of problems, however. The first problem is that the mechanical interface is highly susceptible to wear. A second problem is that the mechanical interface achieves only intermittent electrical contact.

Thus, a problem with present CT scanners is that a large portion of the equipment rotates, but the data received from the rotating equipment must be communicated to a computer that does not rotate. Aside from the mechanical linkages discussed above, other CT scanners are flexible cables to connect the rotating platform to the fixed platform. As a result, most CT scanners cannot allow the platform to rotate continuously. Thus, the rotating platform will make, for example, two rotations and then the transmitting cable must be rewound and the rotations started over again for another two rotations. This procedure causes wear on, and early destruction of, the cables. Moreover, the scanning procedure is rendered unnecessarily long because the platform cannot continuously rotate.

SUMMARY OF THE INVENTION

Accordingly, it is an object of the invention to provide a communication system for transmitting data between a transmitting platform and a receiving platform that eliminates the mechanical interface and the wear of mechanical apparatus as the receive antenna located on the receiving platform moves along the transmitting antenna located on the transmitting platform.

It is another object of the present invention to provide a communication system for transmitting data between a transmitting platform and a receiving platform that has continuous electrical contact as the receive antenna located on the receiving platform moves along the transmitting antenna located on the transmitting platform.

It is a further object of the present invention to permit continuous relative rotation between the transmitting platform and the receiving platform, thereby increasing the life of the transmitting antenna and decreasing the time necessary to complete a CT scan procedure.

The objects given above are accomplished by using a leaky coaxial cable as the transmitting antenna and by forming the transmitting antenna into a circle. Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purpose of the invention, as embodied and as broadly described herein, a communication system for transmitting data between a transmitting platform and a receiving platform, the transmitting and receiving platforms moving relative to each other comprises: a transmitting antenna located on the transmitting platform having two equal lengths of leaky coaxial cable, the two equal lengths disposed to form a circle; driving means for inputting data to the transmitting antenna; a receive antenna located on the receiving platform, the receive antenna being maintained a first predetermined distance from the plane of the transmitting antenna; and receiving means for receiving data from the receive antenna.

According to a second embodiment of the invention, a communication system for transmitting data between a transmitting platform and a receiving platform, the transmitting and receiving platforms moving relative to each other, comprises: a transmitting antenna located on the transmitting platform having two equal lengths of leaky coaxial cable, the two equal lengths disposed to form a circle; driving means for inputting data to the transmitting antenna; at least two receive antennas located on the receiving platform, the receive antennas being maintained a first predetermined distance from the plane of the transmitting antenna; and at least two receiving means for receiving data from the receive antenna.

According to a further embodiment of the invention, a communication system for transmitting data between a transmitting platform and a receiving platform, the transmitting and receiving platforms moving relative to each other, comprises: a transmitting antenna located on the transmitting platform having at least four equal lengths of leaky coaxial cable, the equal lengths being disposed to form a circle; driving means for inputting data to the transmitting antenna; a receive antenna located on the receiving platform, the receive antenna being maintained a first predetermined distance from the plane of the transmitting antenna; and receiving means for receiving data from the receive antenna.

The accompanying drawings, which are incorporated in and constitute a part of this specification, illustrate several embodiments of the invention and, together with the description, serve to explain the principles of the invention.

DESCRIPTION OF THE PREFERRED EMBODIMENTS

Figure 1:
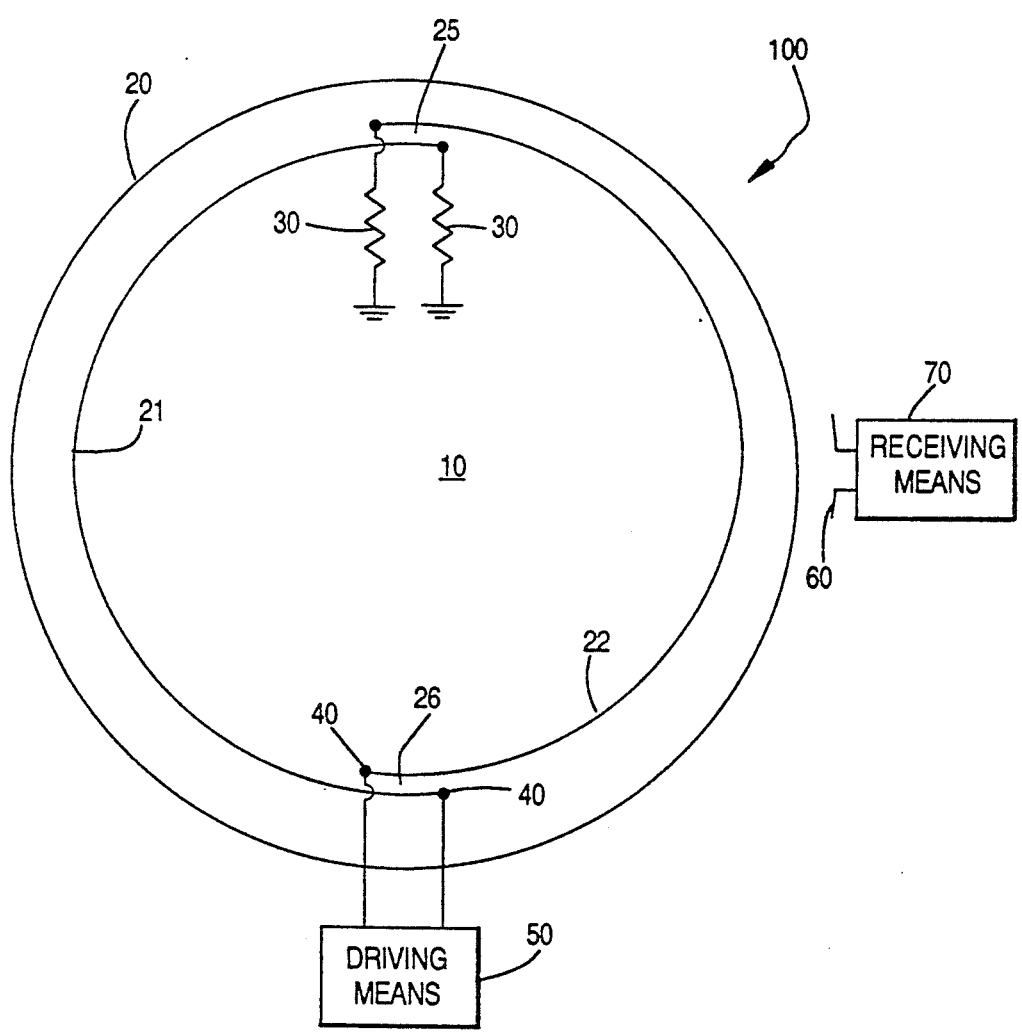
FIG. 1 is a functional block diagram that illustrates a first embodiment of a communication system according to the present invention for transmitting data between a transmitting platform and a receiving platform wherein the transmitting antenna located on the transmitting platform has two equal lengths of leaky coaxial cable forming a circle.

Reference will now be made in detail to the presently preferred embodiments of the invention, examples of which are illustrated in the accompanying drawings. Throughout the drawings, like reference characters are used to indicate like elements.

A preferred embodiment of the communication system according to the present invention is shown in FIG. 1 and is generally designated by reference character 100. As explained further hereinbelow, system 100 is a communication system for transmitting data between a transmitting platform and a receiving platform in relative movement to one another.

According to the present invention, a transmitting antenna 10 is provided located on a transmitting platform 20 and having two equal lengths of leaky coaxial cables 21 and 22. As embodied herein, two equal lengths of leaky coaxial cable 21 and 22 are disposed to form a circle with an overlap at both ends 25 and 26 because each equal length of leaky coaxial cable is slightly longer than one half of the circle. Overlaps 25 and 26 are diametrically opposed. A presently preferred embodiment provides that at overlaps 25 and 26, two equal lengths of leaky coaxial cable 21 and 22 are a radial distance of approximately one (1) centimeter from each other. Other distances between overlaps 25 and 26 are considered to be apparent to those skilled in the art and are within the scope of the present invention.

Each of two equal lengths of leaky coaxial cable 21 and 22 is terminated with a resistor 30 to ground at overlap 25. Termination resistors 30 can be mounted directly at the end of each of equal lengths of leaky coaxial cable 21 and 22 or termination resistors 30 can be mounted remotely and connected with matched cables to the endings of each of equal lengths of leaky coaxial cable.

At overlap 26, at the end of each of two equal lengths of leaky coaxial cable 21 and 22, are feedpoints 40 for inputting data. Feedpoints 40 are at approximately the same azimuth angle with respect to the axis of rotation.

Figure 5B:
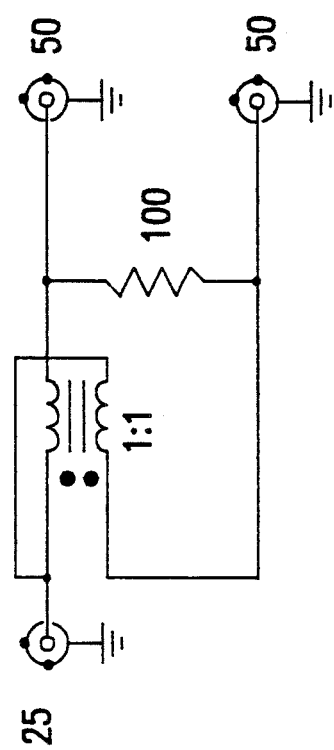
FIG. 5B is a schematic diagram of a transformer-coupled splitter.
Figure 5A:
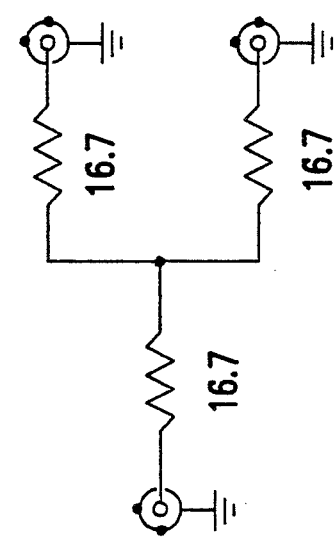
FIG. 5A is a schematic diagram of a simple resistive splitter.

According to the present invention, a driving means is provided for inputting data to transmitting antenna 10 at feedpoints 40. As embodied herein, driving means is designated by reference character 50 and may include a power splitter. A presently preferred embodiment provides that the power splitter of driving means 50 can be mounted a distance of approximately four (4) meters from feedpoints 40 and can be connected to feedpoints 40 by two matched-length normal coaxial cables of the same characteristic impedance. Other distances between the power splitter of driving means 50 and feedpoints 40 can be used and are considered within the scope of the present invention. The power splitter as shown in FIG. 5A of driving means 50 can include a resistor network, a transformer-coupled hybrid network or a transmission line network. Such networks have tight controls on the phase shift and equality of power splitting between the two outputs of the power splitter. If both outputs from the power splitter are terminated with the correct impedance, the voltage across the load impedances will be equal and in phase. Such networks are well-known in the art and need not be described for purposes of the present invention.

The presently preferred embodiment of the invention further provides a receive antenna. As embodied herein, the receive antenna is designated by reference character 60. Receive antenna 60 is, for example, a center-fed dipole antenna, with the dipole oriented parallel to transmitting antenna 10. Other kinds of antennas can be used and are considered within the scope of the present invention.

The present invention further provides a receiving means for receiving data from receive antenna 60. As embodied herein, the receiving means is designated by reference character 70. Receiving means 70 includes an amplifier or a receiver, a suitable filter and a detector for the frequency and modulation employed. A presently preferred embodiment provides that the first amplifier of receiving means 70 be located on the receiving platform approximately less than ten (10) centimeters from receive antenna 60. Other distances between the first amplifier of receiving means 70 and receive antenna 60 may be employed, however, and are within the scope of the present invention.

A presently preferred embodiment of the invention also provides that receive antenna 60 be maintained approximately one to two (1–2) centimeters from the plane of transmitting antenna 10. Other distances between receive antenna 60 and transmitting antenna 10 that will ensure that receive antenna 60 is in the near field region of transmitting antenna 10 may be used and are within the scope of the present invention. At the diametrically opposed overlaps 25 and 26 of two equal lengths of leaky coaxial cable 21 and 22, receive antenna 60 is disposed so as to clear the connections for feedpoints 40 and termination resistors 30 without causing large changes in the spacing between transmitting antenna 10 and receive antenna 60.

An elementary version of a conventional system employing relative movement between a receive antenna and transmitting antenna involves linear translation, rather than rotation, between the transmitter and the receiver. The linear translation system uses a long piece of leaky coaxial cable as a transmitting antenna. The leaky coaxial cable is a coaxial transmission line with suitable holes located in the outer conductor or shield, and is terminated by a resistor. The linear translation system uses a small receive antenna moving near the leaks in the cable to receive the data. The receive antenna senses the electrical field near the coaxial cable which is the measure of voltage on the transmission line near the receive point in a small region under the receive antenna. In this near field region, the receive antenna is sensing the field from the local voltage on the coaxial cable instead of picking up the radiated electromagnetic wave of an entire antenna in the far field region.

If the loss in the cable and the leakage through the holes in the coaxial shield are low, then most of the power applied to the first end of the cable will travel down the cable and dissipate in the termination resistor at the far end. If the termination resistor is a good match to the characteristic impedance of the cable, then the power reflected back toward the first end of the cable will be minimal. Absent reflection, the transmission line is "non-resonant". Thus, the impedance at the feedpoint is independent of frequency and there is no standing wave on the line. A standing wave would give a voltage and current intensity pattern that is stationary in time but varies periodically with distance along the length of the cable. The intensity will vary with distance because of energy leaking out the holes and energy dissipated in the internal losses of the cable. These will cause a monotonic decrease in intensity along the cable length.

A number of problems exist with this elementary version of the invention, however. When using a carrier-frequency traveling wave in the transmission line, the phase difference at the carrier frequency between the sinusoidal voltage at the feedpoint of the transmitting antenna and the voltage at a point along the length of the leaky coaxial cable will be a linear function of the position. This phase difference is caused by the delay due to the finite speed of propagation of the wave traveling down the line. If the carrier-frequency traveling wave is modulated by a pulse, a relative delay between the pulse waveform at the feedpoint and at a point farther down the line will therefore be present. In addition, as the receive antenna slides along the transmitting antenna cable away from the feedpoint, cable losses and leakage will cause a decrease in the signal intensity. These problems can be overcome by a preferred embodiment of the communication system.

Operation of the invention will now be explained with reference to the preferred embodiment illustrated in FIG. 1. The presently preferred operation provides that data are input to transmitting antenna 10 via the power splitter of driving means 50. The data are encoded by a modulator and are input to two equal lengths of leaky coaxial cable 21 and 22 as equal signals, in phase from a common source through a power splitter. Before reaching the modulator, the input signal may include a serial stream of binary values encoded by a modulator to include error correction capability. A suitable sinusoidal voltage generator makes a "carrier" voltage, and this carrier voltage turns on and off in response to the binary value of the data stream. At receive antenna 60 the output signal is amplified to a voltage level high enough to allow an amplitude detector to demodulate the signal at receiving means 70. The demodulated signal is then applied to a voltage comparator (not shown) to discriminate between carrier on and carrier off conditions.

An alternative operation of the invention is to apply input data of a serial stream of binary values to a frequency modulator. The frequency modulator makes a "mark" and "space" frequency in response to the binary value of the data stream. The output signal is demodulated by a suitable frequency demodulator at receiving means 70. The demodulated signal is then discriminated between the mark and space frequency.

The data source can be any measurement or imaging system that produces a digital output. The output can be bit serial in which one one line carries a binary waveform. The digital format must match the modulation control requirement of the modulator; and the modulator can be one of many types. Typically, the modulator is an amplitude modulator, a frequency modulator or a phase modulator.

Other arrangements for developing the data signals are considered to be within the scope of the invention and are considered to be apparent to those skilled in the art.

If the system is unstable, or if the operating frequency is changed often, a superheterodyne system may be used with either the amplitude modulation or the frequency modulation receive antenna 60, and the antenna signal is converted to an intermediate frequency for convenient detection.

If there is excessive interference to the receive antenna from outside sources or if the transmitting antenna produces excessive interference to outside devices, the entire system, i.e., the transmitting antenna and the receive antenna, may be enclosed inside a suitable metal shield. According to the presently preferred embodiment, the metal shield is an annular box with a rectangular cross section cut into two parts. One part shields the transmitting platform, the other shields the receiving platform. The two sections of metal shield are rotating in relation to each other. Other structures are considered apparent to those of ordinary skill in the art in view of this disclosure and are considered within the scope of the present invention.

Another embodiment of the communication system according to the present invention will now be discussed with respect to FIG. 2. Since this embodiment differs from the preferred embodiment only with respect to details of the termination resistor, most of the structural details discussed above are not discussed here. For the sake of simplicity, however, it is to be understood that such structures are incorporated and form a part of the embodiment discussed below. Thus, the discussion below focuses only on the element that differs from the structures and operations present in the preferred embodiment illustrated in FIG. 1.

Figure 2:
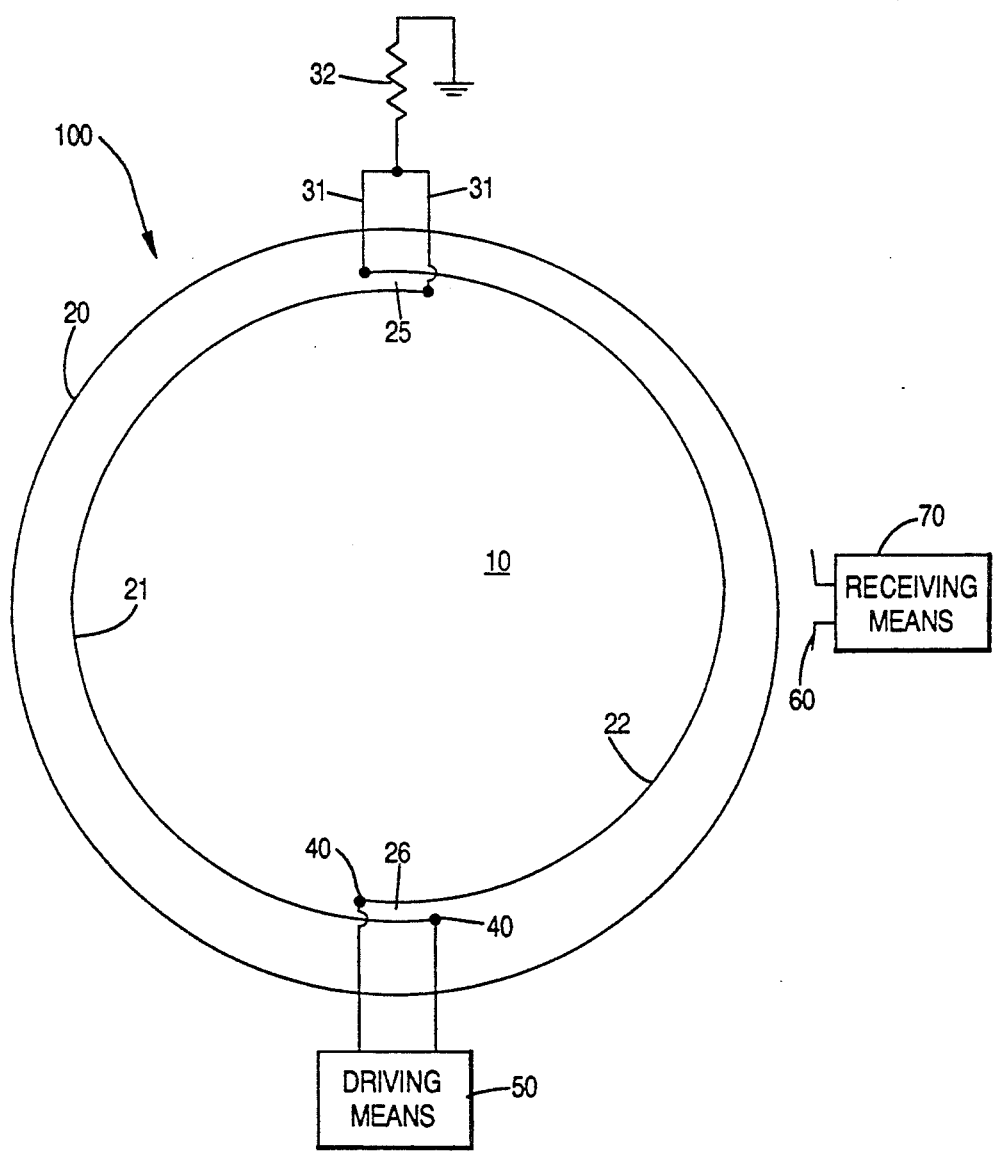
FIG. 2 is a functional block diagram that illustrates a second embodiment of a communication system according to the present invention for transmitting data between a transmitting platform and a receiving platform showing details of the termination resistors remotely mounted.

Turning to the embodiment of a communication system according to the present invention illustrated in FIG. 2, it is seen that each of the ends of equal length of leaky coaxial cable 21 and 22 are connected to two matched cables 31. Two matched cables 31 are connected to single termination resistor 32. Single termination resistor 32 is one half the characteristic impedance of the leaky coaxial cable.

A further embodiment of the communication system according to the present invention will now be discussed with respect to FIG. 3. Since this embodiment differs from the preferred embodiment only with respect to details of the receive antenna and the receiving means, most of the structural details discussed above are not illustrated in FIG. 3. For the sake of simplicity, however, it is to be understood that such structures are incorporated in and form a part of the embodiment discussed below. Thus, the discussion below focuses only on those elements that differ from the structures and operations present in the preferred embodiment illustrated in FIG. 1.

Figure 3:
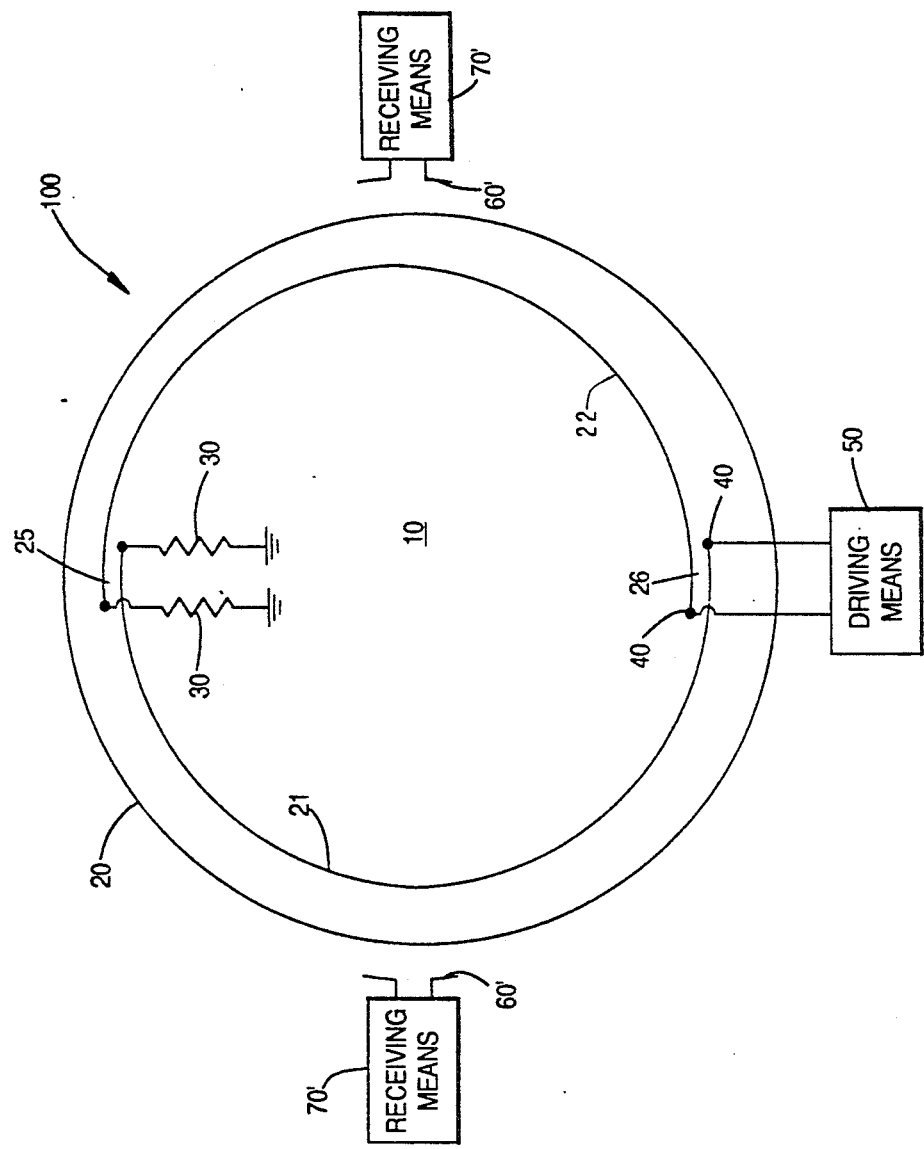
FIG. 3 is a functional block diagram that illustrates a third embodiment of a communication system according to the present invention for transmitting data between a transmitting platform and a receiving platform showing at least two receive antennas and receiving means.

Turning to the embodiment of a communication system according to the present invention illustrated in FIG. 3, it is seen that more than one receive antenna 60' and receiving means 70' are used. Receive antennas 60' can be be ninety (90°) degrees apart, however other distances can be used and are considered within the scope of the present invention.

The operation of the embodiment illustrated in FIG. 3 involves demodulating the signals at each receiving means 70' separately. The separate demodulator outputs are then either combined or selected to get a better signal to discriminate.

Figure 4:
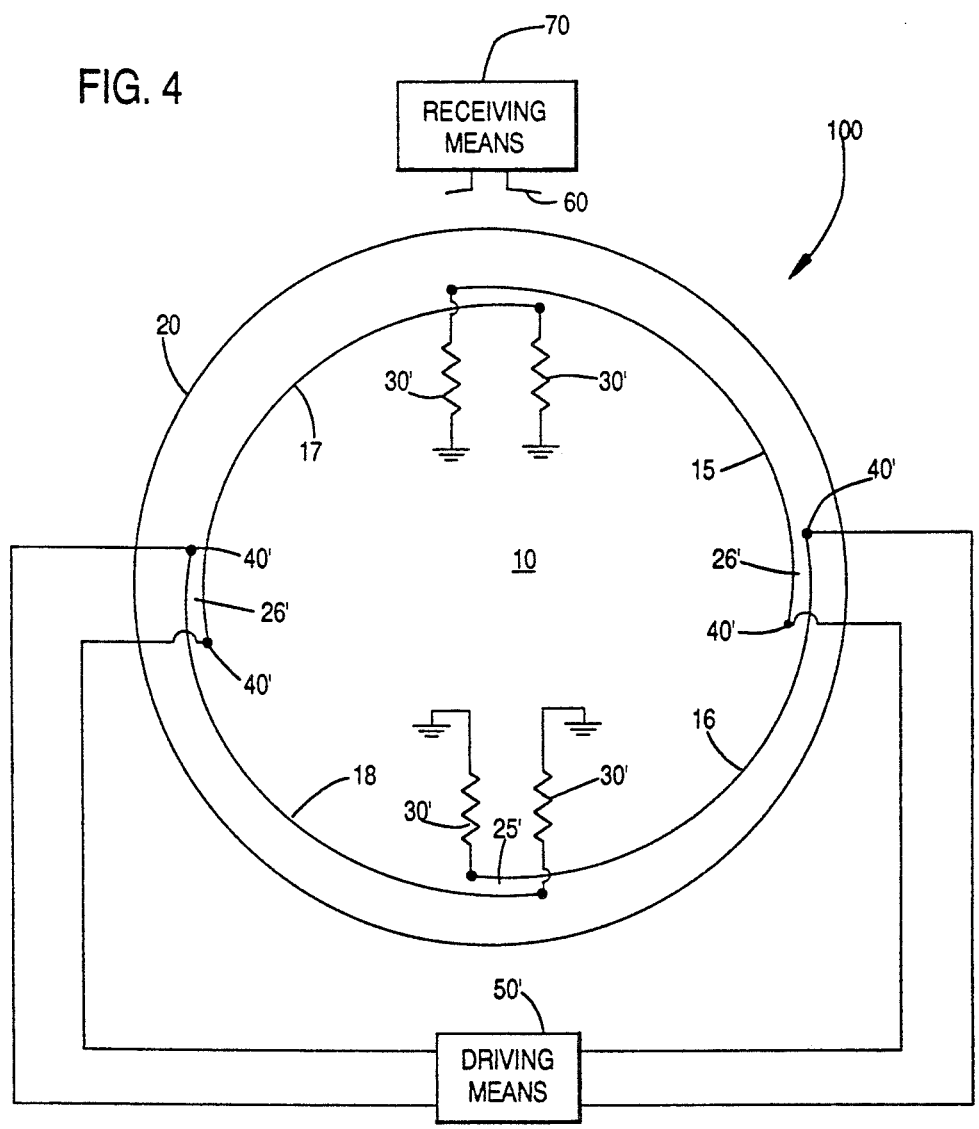
FIG. 4 is a functional block diagram that illustrates a fourth embodiment of a communication system according to the present invention for transmitting data between a transmitting platform and a receiving platform showing at least four equal lengths of leaky coaxial cable.

Another embodiment of the communication system according to the present invention will be now be discussed with respect to FIG. 4. Since this embodiment differs from the preferred embodiment only with respect to the details of the transmitting antenna, most of the structural details discussed above are not illustrated in FIG. 4. For the sake of simplicity, it is to be understood that such structures are incorporated in and form a part of the embodiment discussed below. Thus, the discussion below focuses only on those elements that differ from the structures and operations present in the preferred embodiment illustrated in FIG. 1.

Turning to the embodiment of a communication system according to the present invention illustrated in FIG. 4, it is seen that the transmitting antenna 10 comprises four equal lengths of coaxial cable 15, 16, 17, 18 forming a circle so that the pulse delay from one feedpoint 40' to the next termination resistor 30' is minimized. The number of equal lengths of coaxial cable forming the circle can be any even number. One end of each equal length of coaxial cable 25' is terminated with resistor 30' to ground. The other end of each of equal lengths of coaxial cable 26' is feedpoint 40' and is connected to the power splitter of driving means 50'. The power splitter of driving means 50' can be connected to feedpoints 40' with matched-length normal coaxial cables of the same characteristic impedance.

The present invention may, therefore, be summarized as providing a communication system for transmitting data between a transmitting platform and a receiving platform using leaky coaxial cable as the transmitting antenna located on the transmitting platform wherein there is no mechanical interface and wear of mechanical apparatus and there is continuous electrical contact as the receive antenna slides along the transmitting antenna. Furthermore, the present invention allows continuous relative rotation between the transmitting and receiving platforms thereby increasing the life of the transmitting antenna and decreasing the time necessary to complete a CT scan procedure.

It will be apparent to those skilled in the art that modifications and variations can be made in the communication system of the present invention. The invention in its broader aspects is, therefore, not limited to the specific details, representative methods and apparatus, and illustrated examples shown and described herein. Thus, it is intended that all matter contained in the foregoing description and shown in the accompanying drawings, shall be interpreted as illustrative and not in a limiting sense.

What is claimed is:

1. A communication system for transmitting data between a transmitting platform and a receiving platform, the transmitting and receiving platforms moving relative to each other, comprising:
   a transmitting antenna located on the transmitting platform having two equal lengths of leaky coaxial cable, the two equal lengths disposed to form a circle, wherein each of the two equal lengths of coaxial cable has two respective ends with an overlap at both respective ends, the overlaps being diametrically opposed, one overlap at the end of each of the two equal lengths of leaky coaxial cable is terminated with a resistor to ground and one overlap at the end of each of the two equal lengths of leaky coaxial cable is a feedpoint for input data;
   driving means for inputting the data simultaneously to the two equal lengths of leaky coaxial cable of the transmitting antenna;
   a receive antenna located on the receiving platform, the receive antenna being maintained a first predetermined distance from a plane of the transmitting antenna; and
   receiving means for receiving the data from the receive antenna and for demodulating the received data.

2. The communication system as recited in claim 1 wherein the driving means includes a power splitter.

3. The communication system as recited in claim 1 wherein the receive antenna is oriented parallel to the transmitting antenna.

4. The communication system as recited in claim 1 wherein the receiving means is maintained a second predetermined distance from the receive antenna.

5. The communication system as recited in claim 1 wherein the first predetermined distance between the receive antenna and the plane of the transmitting antenna is maintained at the two overlaps at the ends of each of the two equal lengths of leaky coaxial cable forming a circle.

6. A communication system for transmitting data between a transmitting platform and a receiving platform, the transmitting and receiving platforms moving relative to each other, comprising:
   a transmitting antenna located on the transmitting platform having two equal lengths of leaky coaxial cable, the two equal lengths disposed to form a circle, wherein each of the two equal lengths of coaxial cable has two respective ends with an overlap at both respective ends, the overlaps being diametrically opposed, one overlap at the end of each of the two equal lengths of leaky coaxial cable is terminated with a resistor to ground and one overlap at the end of each of the two equal lengths of leaky coaxial cable is a feedpoint for input data;

driving means for inputting the data simulataneously to the two leaky coaxial cable of the transmitting antenna;

at least two receive antennas located on the receiving platform, the receive antennas being maintained a first predetermined distance from a place of the transmitting antenna; and at least two receiving means for receiving the data from the respective receive antennas, and for demodulating the received data.

7. The communication system as recited in claim 6 wherein the driving means includes a power splitter.

8. The communication system as recited in claim 6 wherein the receive antennas are oriented parallel to the transmitting antenna.

9. The communication system as recited in claim 6 wherein the receiving means are maintained a second predetermined distance from the receive antennas.

10. The communication system as recited in claim 6 wherein the first predetermined distance between the receive antennas and the plane of the transmitting antenna is maintained at the two overlaps at the end of each of the two equal lengths of leaky coaxial cable forming a circle.

11. A communication system for transmitting data between a transmitting platform and a receiving platform, the transmitting and receiving platforms moving relative to each other, comprising:

a transmitting antenna located on the transmitting platform having at least four equal lengths of leaky coaxial cable, the equal lengths being disposed to form a circle, wherein the equal links of leaky coaxial cable each has two respective ends with an overlap with the respective ends of the adjacent equal lengths of leaky coaxial cable, one overlap at the end of each of the equal lengths of leaky coaxial cable is terminated with a resistor to ground and one overlap at the end of each of the equal lengths of coaxial cable is a feedpoint for input data;

driving means for inputting the data simultaneously to the four equal lengths of leaky coaxial cable of the transmitting antenna;

a receive antenna located on the receiving platform, the receive antenna being maintained a first predetermined distance from a plane of the transmitting antenna; and receiving means for receiving the data from the receive antenna and for demodulating the received data.

12. The communication system recited in claim 11 wherein the number of the equal lengths of leaky coaxial cable is any even number.

13. The communication system as recited in claim 11 wherein the driving means includes a power splitter.

14. The communication system as recited in claim 11 wherein the receive antenna is oriented parallel to the transmitting antenna.

15. The communication system as recited in claim 11 wherein the receiving means is maintained a second predetermined distance from the receive antenna.

16. The communication system as recited in claim 11 wherein the first predetermined distance between the receive antenna and the plane of the transmitting antenna is maintained at the overlaps at the end of each of the equal lengths of leaky coaxial cable forming a circle.

* * * * *

UNITED STATES PATENT AND TRADEMARK OFFICE
CERTIFICATE OF CORRECTION

PATENT NO. : 5,157,393
DATED : October 20, 1992
INVENTOR(S) : Timothy R. Fox et al.

It is certified that error appears in the above-identified patent and that said Letters Patent is hereby corrected as shown below:

Claim 6, column 9, line 1, change "simulataneously" to --simultaneously--.

Claim 6, column 9, line 2, after "two" insert --equal lengths of--.

Claim 6, column 9, line 6, change "place" to --plane--.

Claim 12, column 10, line 17, before "recited" insert --as--.

Signed and Sealed this

First Day of February, 1994

BRUCE LEHMAN

*Attest:*

*Attesting Officer*   Commissioner of Patents and Trademarks